(12) United States Patent
Salanta et al.

(10) Patent No.: US 8,381,514 B2
(45) Date of Patent: Feb. 26, 2013

(54) ON-VEHICLE NITROGEN OXIDE AFTERTREATMENT SYSTEM

(75) Inventors: Gabriel Salanta, Ann Arbor, MI (US); Timothy Jackson, Dexter, MI (US); Henry Sullivan, Northville, MI (US); Adam J. Kotrba, Laingsburg, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 284 days.

(21) Appl. No.: 12/773,314

(22) Filed: May 4, 2010

(65) Prior Publication Data

US 2011/0197569 A1    Aug. 18, 2011

Related U.S. Application Data

(60) Provisional application No. 61/305,272, filed on Feb. 17, 2010.

(51) Int. Cl.
*F01N 3/035* (2006.01)
*F01N 3/20* (2006.01)

(52) U.S. Cl. ................ 60/286; 60/295; 60/301

(58) Field of Classification Search ............... 60/286, 60/295, 301
See application file for complete search history.

(56) References Cited

U.S. PATENT DOCUMENTS

| 4,522,027 | A * | 6/1985 | Hasegawa et al. ............ 60/274 |
|---|---|---|---|
| 5,149,511 | A | 9/1992 | Montreuil et al. |
| 5,279,997 | A | 1/1994 | Montreuil et al. |
| 5,612,010 | A | 3/1997 | Pandey et al. |
| 5,907,950 | A | 6/1999 | Enderle et al. |
| 5,976,475 | A | 11/1999 | Peter-Hoblyn et al. |
| 6,314,722 | B1 | 11/2001 | Matros et al. |
| 6,898,929 | B2 | 5/2005 | Asmus et al. |
| 6,941,746 | B2 | 9/2005 | Tarabulski et al. |
| 6,996,975 | B2 * | 2/2006 | Radhamohan et al. ......... 60/286 |
| 7,065,958 | B2 | 6/2006 | Funk et al. |
| 7,090,811 | B2 | 8/2006 | Cho et al. |
| 7,264,785 | B2 | 9/2007 | Blakeman et al. |
| 7,367,182 | B2 | 5/2008 | Takahashi et al. |
| 7,424,881 | B2 * | 9/2008 | Kerns ............................ 123/431 |
| 2007/0289291 | A1* | 12/2007 | Rabinovich et al. ............ 60/286 |
| 2008/0022654 | A1 | 1/2008 | Broderick et al. |
| 2008/0053075 | A1 | 3/2008 | Ueda et al. |
| 2008/0087008 | A1 | 4/2008 | Reba et al. |
| 2008/0127634 | A1 | 6/2008 | Cho et al. |
| 2008/0131345 | A1 | 6/2008 | Vitse et al. |
| 2010/0000202 | A1 | 1/2010 | Fisher et al. |
| 2011/0239624 | A1 | 10/2011 | Li et al. |

OTHER PUBLICATIONS

Article entitled "Tenneco and GE Transportation to Develop Hydrocarbon-SCR Technology for Diesel Emission Aftertreatment" Green Car Congress, Feb. 4, 2009, 2 pages.

* cited by examiner

*Primary Examiner* — Thomas Denion
*Assistant Examiner* — Brandon Lee
(74) *Attorney, Agent, or Firm* — Harness, Dickey & Pierce, P.L.C.

(57) ABSTRACT

An emissions system for reducing nitrogen oxides in engine exhaust includes an emissions catalyst having an inlet adapted to receive an exhaust from the engine. A fuel tank is adapted to provide fuel for combustion within the engine. A first injector is operable to inject fuel into the exhaust upstream of the catalyst. A second injector is operable to inject supplemental reductant from a supplemental reductant tank into the exhaust upstream of the catalyst. A controller is operable to control the first and second injectors and vary the supply of fuel and supplemental reductant into the exhaust to reduce nitrogen oxides within the exhaust.

20 Claims, 6 Drawing Sheets

ON-VEHICLE NITROGEN OXIDE AFTERTREATMENT SYSTEM

CROSS-REFERENCE TO RELATED APPLICATIONS

This application claims the benefit of U.S. Provisional Application No. 61/305,272, filed on Feb. 17, 2010. The entire disclosure of the above application is incorporated herein by reference.

BACKGROUND

Selective catalytic reduction technology has been used in conjunction with reducing nitrogen oxides present in the exhaust of internal combustion engines. Many vehicles utilizing internal combustion engines as a prime mover are also equipped with exhaust aftertreatment devices for reducing nitrogen oxide emissions. Some of these systems are constructed using urea-based technology including a separate container mounted to the vehicle for storing the urea, a urea injector and a selective catalytic reduction catalyst. While these systems may have performed well in the past, it may be desirable to provide a selective catalytic reduction system operable without the use of urea or other reductants not typically onboard a vehicle.

SUMMARY

This section provides a general summary of the disclosure, and is not a comprehensive disclosure of its full scope or all of its features.

An emissions system for reducing nitrogen oxides in engine exhaust includes an emissions catalyst having an inlet adapted to receive an exhaust from the engine. A fuel tank is adapted to provide fuel for combustion within the engine. A first injector is operable to inject fuel into the exhaust upstream of the catalyst. A second injector is operable to inject supplemental reductant from a supplemental reductant tank into the exhaust upstream of the catalyst. A controller is operable to control the first and second injectors and vary the supply of fuel and supplemental reductant into the exhaust to reduce nitrogen oxides within the exhaust.

An emissions system for reducing nitrogen oxides in engine exhaust includes an emissions catalyst having an inlet adapted to receive an exhaust from the engine. An injector is operable to inject a reductant into the exhaust upstream of the catalyst. A fuel tank is adapted to provide fuel for combustion within the engine. A valve is supplied fuel from the fuel tank. The valve is also in receipt of a reductant from a supplemental reductant tank. The valve is operable to selectively supply one or both of the fuel and the supplemental reductant to the injector to reduce nitrogen oxides within the exhaust.

An emissions system includes an emissions catalyst having an inlet adapted to receive an exhaust from an engine. A first injector is operable to inject fuel from a fuel tank into the exhaust upstream of the catalyst. The fuel tank also provides fuel for combustion in the engine. A second injector is operable to inject supplemental reductant stored in a supplemental reductant tank into the exhaust upstream of the catalyst. A burner is in receipt of the exhaust and positioned upstream from the first and second injectors. A diesel particulate filter is positioned downstream of the burner and upstream of the first and second injectors. A controller is operable to control the burner as well as the first and second injectors to vary the supply of fuel and supplemental reductant into the exhaust to reduce nitrogen oxides within the exhaust.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
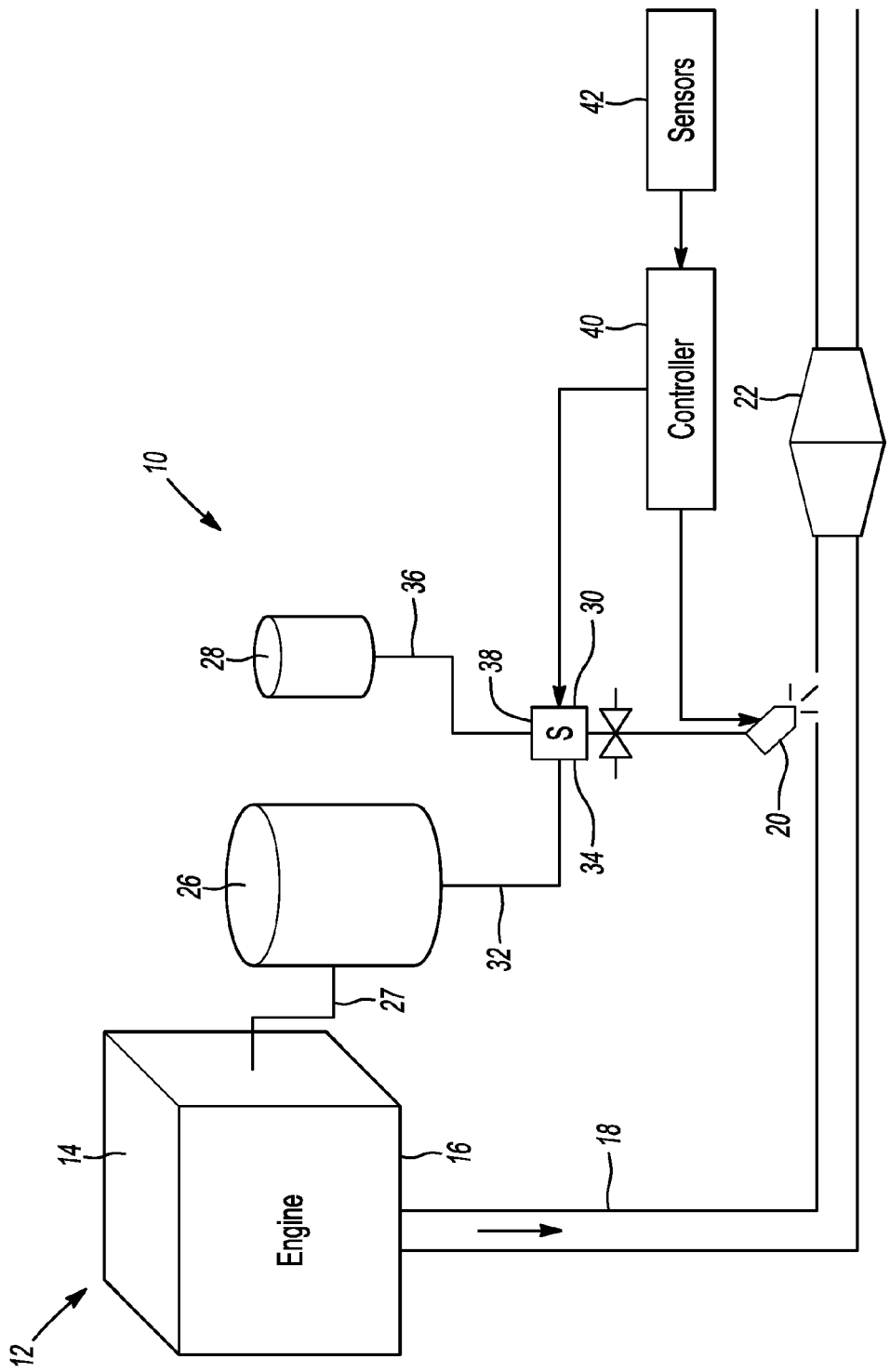
FIG. 1 is a schematic view of a selective catalytic reduction (SCR) system with multiple reductants on a vehicle.

FIG. 1 depicts an exhaust treatment system 10 associated with an exemplary vehicle 12. Vehicle 12 includes an engine 14 arranged as a prime mover having an exhaust port 16 in fluid communication with an exhaust pipe 18. Engine exhaust flows through pipe 18 in the direction indicated by the arrow. An injector 20 is positioned to inject a reductant into the engine exhaust flowing through exhaust pipe 18. An emissions catalyst 22 is positioned downstream of injector 20 and is in receipt of engine exhaust flowing through pipe 18.

A fuel tank 26 is mounted to vehicle 12 to store fuel. Fuel tank 26 is in communication with engine 14 via a fuel supply line 27 such that fuel may be selectively supplied to combustion chambers of engine 14. It is contemplated that engine 14 may be a gasoline fueled spark ignition engine or may be a diesel fueled compression engine. Fuels for the gasoline engine may include gasoline, E85, E95 or other similar fuels. Fuels for the diesel engine may include diesel fuel, biofuel B5, B10, B20 or other similar fuels. A supplemental reductant tank 28 is also mounted to vehicle 12. It is contemplated that tank 28 may store a readily available reductant such as E85, E95, B5, B10, B20 or the like.

A valve 30 selectively interconnects injector 20 with one or both of fuel tank 26 and supplemental reductant tank 28. More particularly, a first supply line 32 extends from fuel tank 26 to a first inlet port 34 of valve 30. In similar fashion, a second supply line 36 interconnects tank 28 and a second inlet port 38 of valve 30.

A controller 40, such as an electronic control unit, is operable to control valve 30 to selectively supply reductant to injector 20. Controller 40 may cause valve 30 to solely provide fuel from tank 26 to injector 20. Depending on the conditions present, fuel may act as a suitable reductant. Controller 40 may also control valve 30 to solely supply the reductant stored within supplemental reductant tank 28 to injector 20. Controller 40 may simultaneously provide fuel and a supplemental reductant to injector 20 at one of any number of mixing ratios between 0-100%.

A plurality of sensors 42 may be in communication with controller 40 such that the signal provided to control valve 30 is based on an evaluation of vehicle data. Sensors 42 may provide signals indicative of, but not limited to, engine speed, engine operating temperature, exhaust temperature, mass air flow, diesel fuel volume within tank 26, reductant volume within tank 28, $NO_x$ concentration, HC concentration, $O_2$ concentration, $H_2$ concentration, ammonia concentration and other data that may be available from a CAN bus or dedicated sensors mounted to vehicle 12. Based on the input provided from sensors 42, controller 40 selectively operates injector 20 by injecting the reductant flowing through valve 30.

Figure 2:
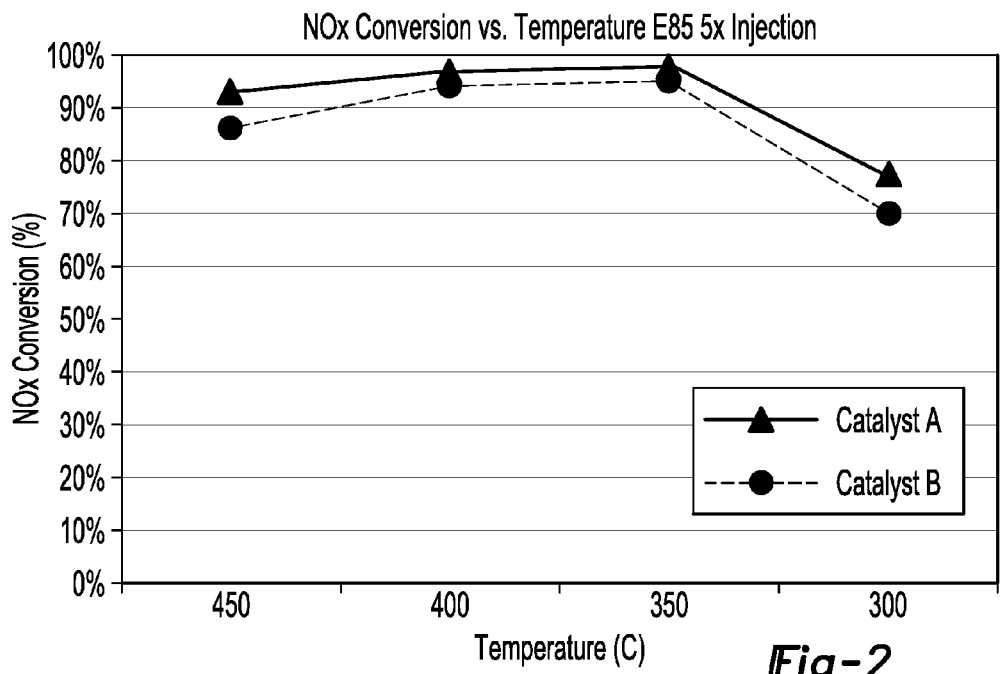
FIG. 2 is a graph depicting $NO_x$ conversion versus temperature using E85 as a reductant with different catalysts.

FIG. 2 depicts $NO_x$ conversion versus temperature having E85 as a reductant used in cooperation with two different catalysts. Catalyst A and catalyst B represent two known catalysts used for selective catalytic reduction in urea-based systems. It should be noted that relatively high $NO_x$ conversion is depicted while using E85 as the reductant with either catalyst. The graph depicts a merely exemplary and non-limiting example of E85 concentration where the hydrocarbon to $NO_x$ ratio is five.

Figure 3:
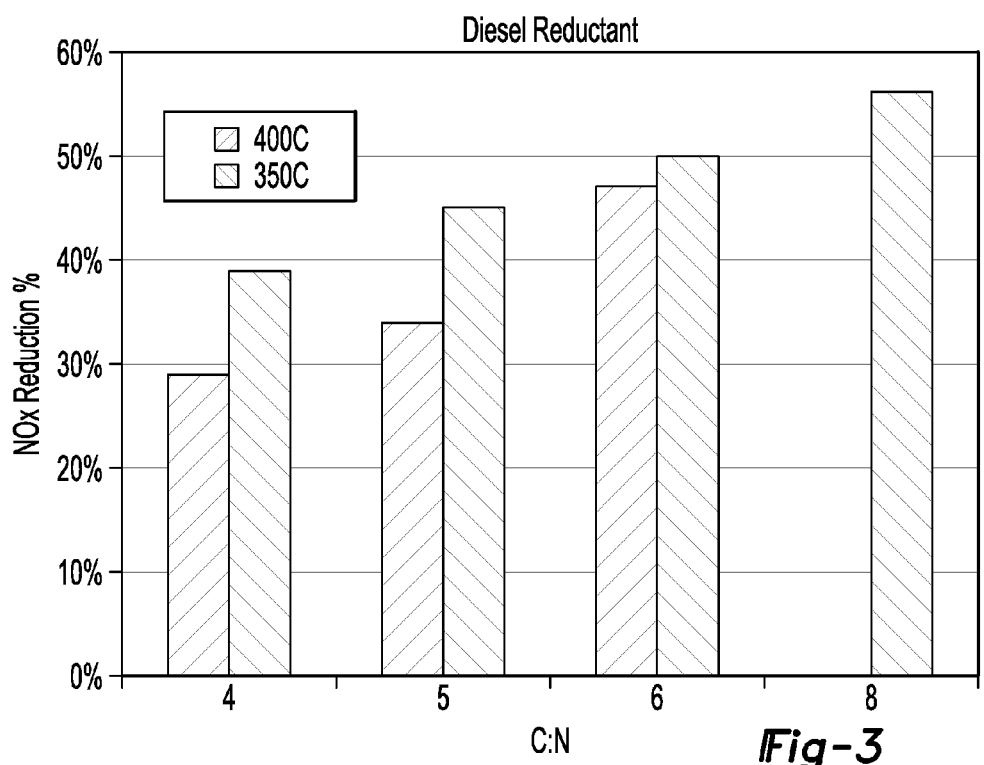
FIG. 3 is a graph depicting $NO_x$ reduction percentage versus a ratio of hydrocarbon to NOx using diesel fuel as a reductant.

FIG. 3 depicts $NO_x$ reduction percent versus a ratio of hydrocarbon to $NO_x$ while using diesel fuel as a reductant. $NO_x$ reduction ranges from approximately 38% to 56% as the ratio of hydrocarbon to $NO_x$ ranges from 4-8 at an operating temperature of approximately 350° C. $NO_x$ reduction ranges from approximately 28-47% as the ratio of hydrocarbon to $NO_x$ varies from 4-6 at an operating temperature of approximately 400° C. Based on the dual reductant source and valve arrangement shown in FIG. 1, it should be appreciated that effective $NO_x$ reduction may be achieved solely through the use of E85 as a reductant. $NO_x$ reduction may also be achieved through the use of engine fuel as a reductant.

Figure 4:
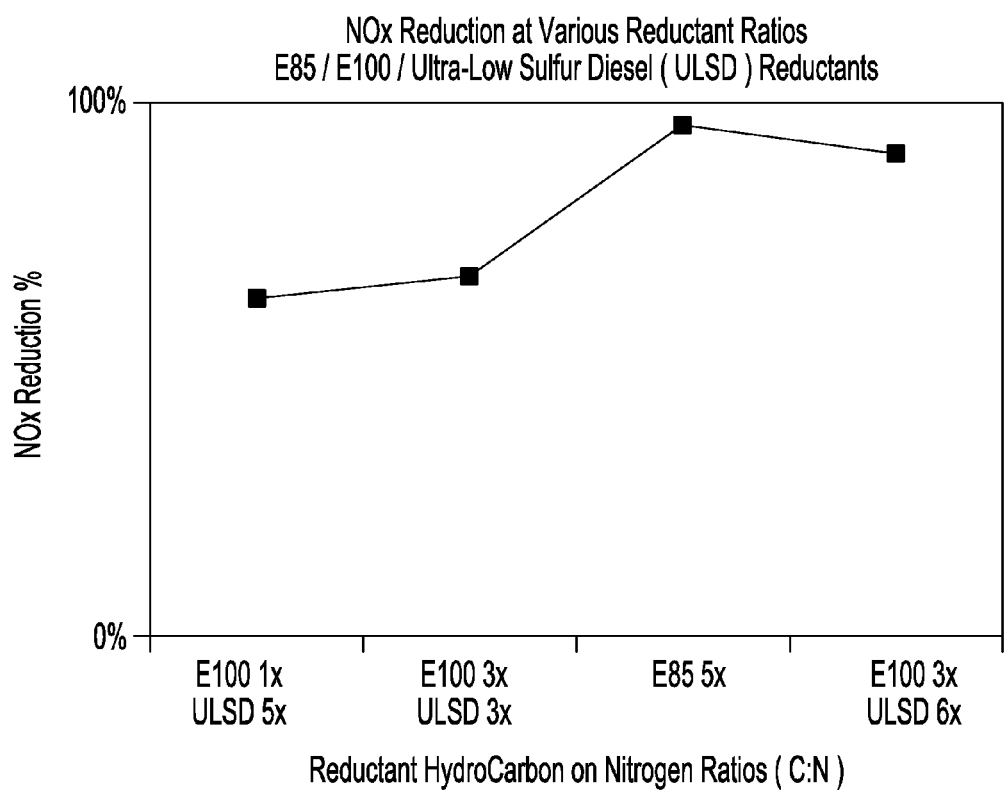
FIG. 4 is a graph depicting $NO_x$ reduction at various reductant ratios.

It is also contemplated that two or more different reductants may be simultaneously injected into the exhaust stream to effectively convert $NO_x$ in the exhaust stream to $N_2$. FIG. 4 depicts $NO_x$ reduction at various reductive ratios where a first reductant includes E100 and a second reductant includes ultra-low sulfur diesel (ULSD). Percentage $NO_x$ reduction was determined for several different reductant ratios where E100 and ULSD were simultaneously injected into an exhaust stream. A first $NO_x$ reduction percentage was determined using E100 at a carbon to nitrogen ratio of 1 being simultaneously injected with ULSD having a carbon to nitrogen ratio of 5. A second $NO_x$ reduction percentage was determined using the reductant ratio of E100 having a carbon to nitrogen ratio of 3 being simultaneously injected with ULSD having a carbon to nitrogen ratio of 3. At the far right of the chart shown in FIG. 4, a different reduction ratio was evaluated for $NO_x$ reduction effectiveness. E100 at a carbon to nitrogen ratio of 3 was simultaneously injected with ULSD having a carbon to nitrogen ratio of 6. The second data point from the right shown in FIG. 4 corresponds to 100% E85 being injected at a carbon to nitrogen ratio of 5.

FIGS. 2, 3 and 4 illustrate that it may beneficial to determine a ratio of primary and secondary reductant dynamically in response to engine operating conditions. In particular, it may be desirable to monitor an engine exhaust temperature at one or more locations relative to a catalyst. Furthermore, controller 40 may be programmed to estimate a carbon to nitrogen ratio of one or more reductants stored on board vehicle 12. Based on the $NO_x$ reduction percentages obtained during various reductant ratios and exhaust temperatures, controller 40 may optimize the use of reductant stored within tank 28. Controller 40 may also evaluate other vehicle operating conditions including throttle position, engine speed and vehicle speed to set a target $NO_x$ reduction percentage and subsequently determine a desired reductant injection ratio.

Figure 5:
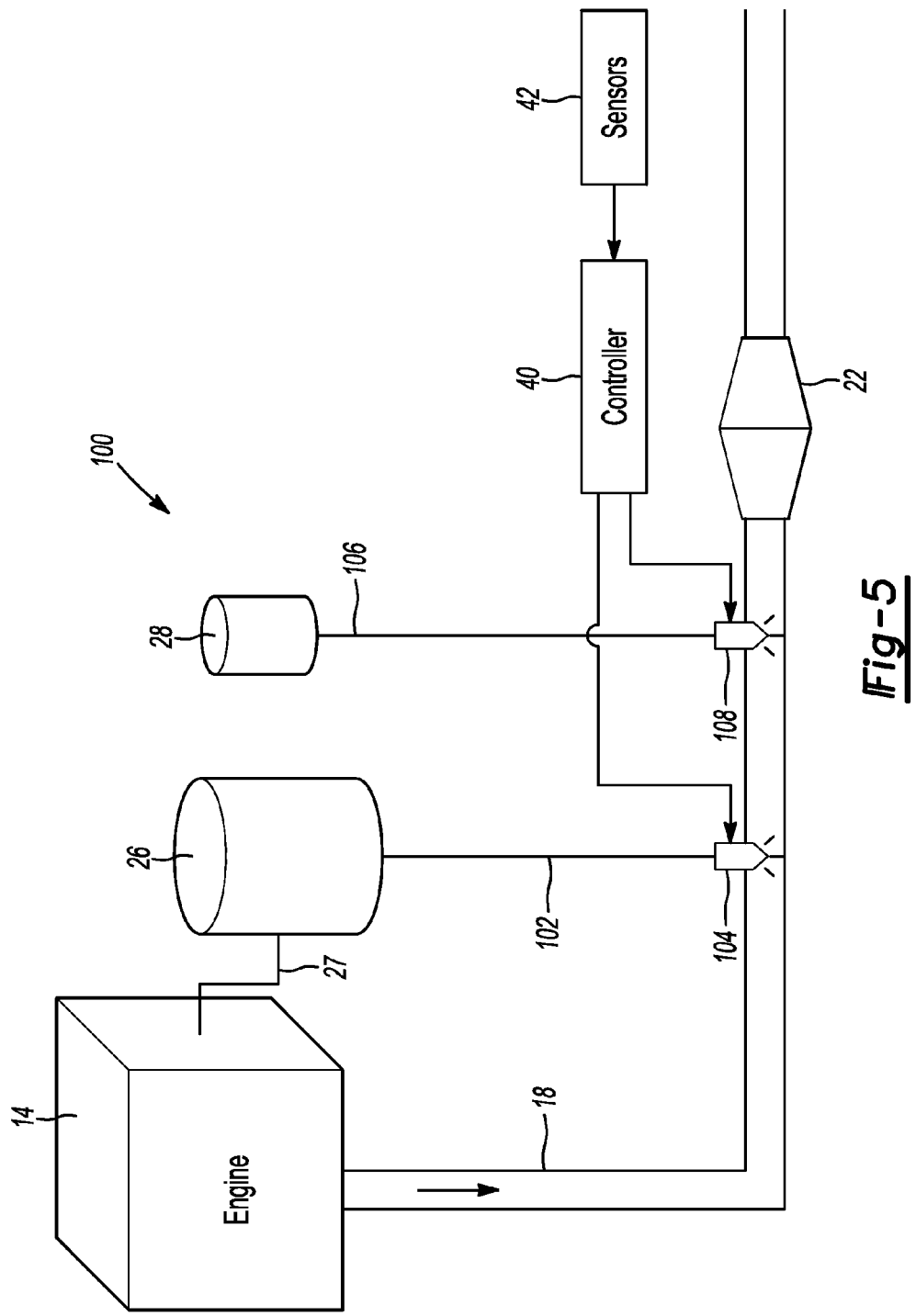
FIG. 5 is a schematic view of an alternate selective catalytic reduction (SCR) system with multiple reductants on a vehicle.

FIG. 5 depicts an alternate exhaust treatment system 100. Exhaust treatment system 100 is substantially similar to exhaust treatment system 10. Accordingly, like elements will retain their previously introduced reference numerals. Exhaust treatment system 100 includes fuel tank 26 and supplemental reductant tank 28. A fuel supply line 102 interconnects fuel tank 26 and a first injector 104. First injector 104 is operable to selectively supply fuel as a reductant to the engine exhaust flow in pipe 18. The supply of fuel into the exhaust stream is controlled by controller 40.

Another supply line 106 interconnects reductant tank 28 with a second injector 108. Second injector 108 is selectively operable to inject the reductant contained within tank 28 into the exhaust stream passing through exhaust pipe 18. It should be appreciated that while first injector 104 is depicted as being upstream of second injector 108 in FIG. 4, this relative position may be reversed or first injector 104 may be positioned at substantially the same distance from emissions catalyst 22 as second injector 108. To achieve this arrangement, the injectors may be positioned at different rotational clocking orientations about exhaust pipe 18. Controller 40 is also in communication with second injector 108 to define and control when reductant stored within tank 28 is to be supplied to the exhaust flowing through exhaust pipe 18.

Figure 6:
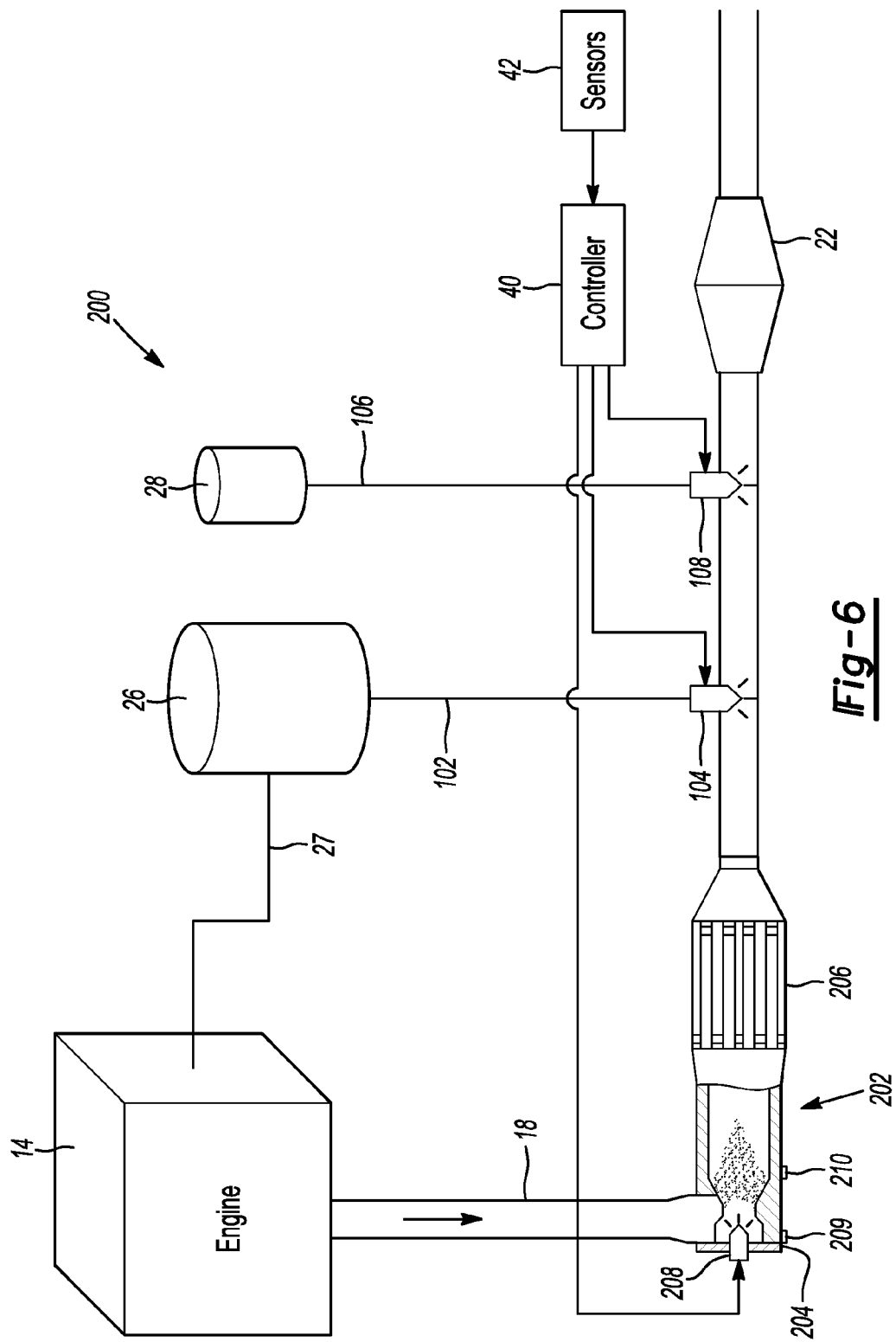
FIG. 6 is a schematic view of another alternate selective catalytic reduction (SCR) system with multiple reductants on a vehicle.

FIG. 6 depicts another alternate exhaust treatment system identified at reference numeral 200. Exhaust treatment system 200 is substantially similar to exhaust treatment system 100. Accordingly, like elements will retain their previously introduced reference numerals. Exhaust treatment system 200 includes each of the elements of exhaust treatment system 100 as well as a thermal management device 202 positioned upstream from first injector 104 and second injector 108. Thermal management device 202 may include a burner 204 for increasing the temperature of exhaust flowing through exhaust pipe 18. Thermal management device 202 may also include a diesel particulate filter 206. Thermal management device 202 may include both burner 204 and diesel particulate filter 206.

Burner 204 may include an injector 208 operable to supply an ignitable fuel to the exhaust stream. An additional source of oxygen may be provided by a pressurized air source 209. An igniter 210 may also be provided as part of burner 204 to selectively ignite fuel that may be within the exhaust flowing through exhaust pipe 18 with or without additional fuel being supplied via injector 208. When burner 204 is used in combination with diesel particulate filter 206, the filter may be actively regenerated by energizing burner 204 to burn soot previously collected by diesel particulate filter 206. Controller 40 is operable to control igniter 210 and injector 208 to define when burner 204 heats the exhaust.

Figure 7:
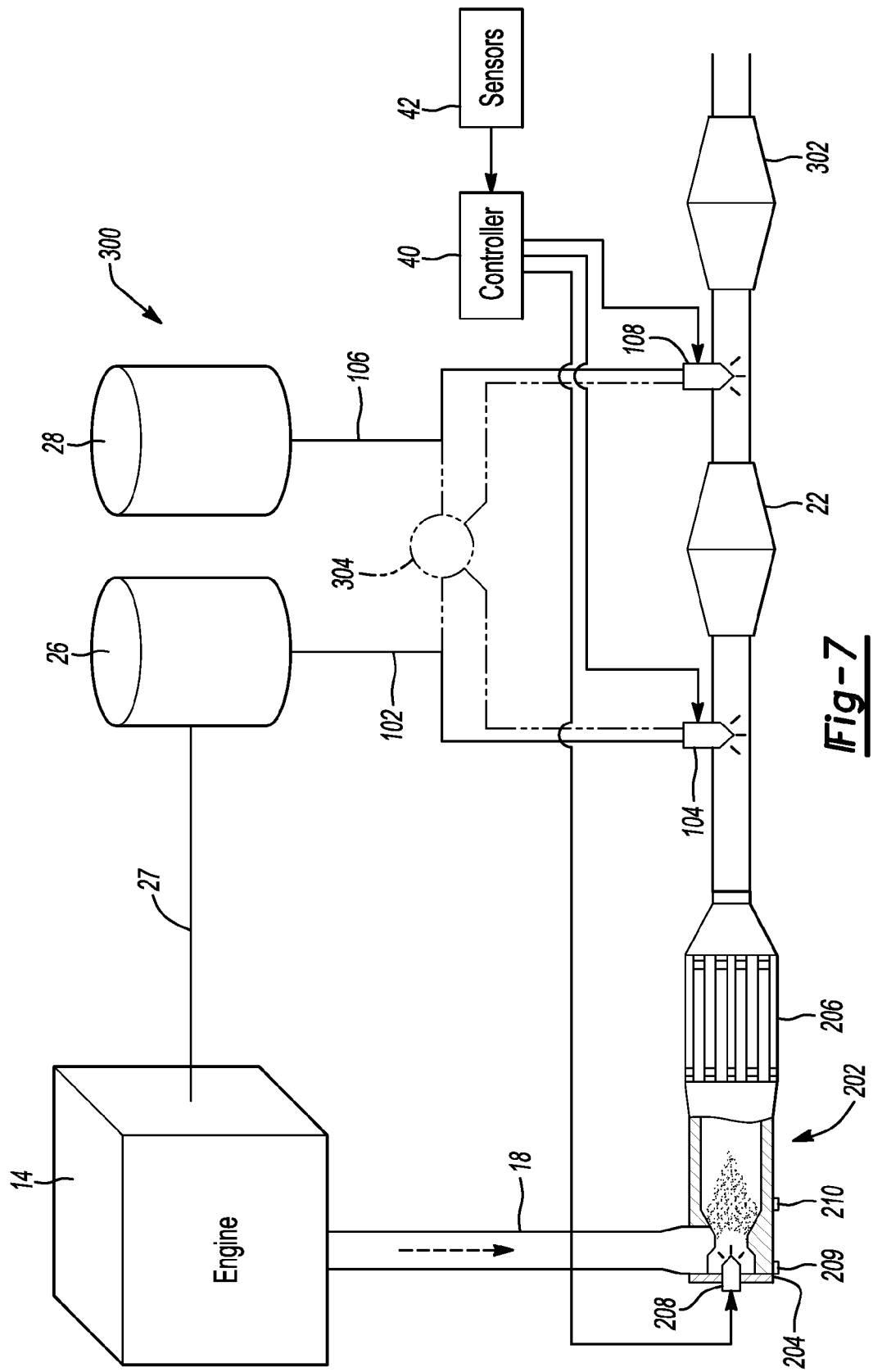
FIG. 7 is a schematic view of another alternate selective catalytic reduction (SCR) system with multiple reductants on a vehicle.

FIG. 7 illustrates another alternate exhaust treatment system identified at reference numeral 300. Exhaust treatment system 300 is substantially similar to exhaust treatment system 200. Accordingly, like elements will retain their previously introduced reference numerals. Exhaust treatment system 300 includes each of the elements of exhaust treatment system 200 as well as an additional catalyst 302 positioned in series with and downstream from catalyst 22. Reductant tank 26 provides reductant to first injector 104 upstream of catalyst 22. Reductant tank 28 provides reductant to second injector 108 downstream of catalyst 22 and upstream of catalyst 302. It is contemplated that catalyst 22 and catalyst 302 are substantially similar to one another. The use of two catalysts in series may provide an increased $NO_x$ reduction percentage and longer catalyst life for each of catalyst 22 and catalyst 302.

The use of diesel fuel as a reductant may increase the likelihood of coking within the catalyst immediately downstream from the diesel fuel reductant injector. FIG. 7 depicts diesel fuel as the reductant stored within tank 26 and provided to first injector 104. Thermal management device 202 is positioned closest to catalyst 22 in receipt of diesel fuel as the reductant. The increased temperature of the exhaust may minimize the coking and assist with catalyst regeneration, if desired. During operation, first injector 104 and second injector 108 may be individually operated or simultaneous reductant injection may occur depending on the engine operating conditions, as previously discussed.

In an alternate arrangement, an optional valve 304 may be operable to supply the reductant within fuel tank 26 to second injector 108 and provide the reductant within tank 28 to first injector 104. A switching of the reductant supply may facilitate regeneration of catalyst 22 and/or catalyst 302. A switching of reductants may increase the life of both catalyst 22 and catalyst 302. It should also be appreciated that the concepts of the present disclosure may be utilized in conjunction with engines outputting large volumes of exhaust per unit time. Some exhaust systems include multiple parallel conduits in communication with the engine. It is within the scope of the present disclosure to use multiple sets of injectors and/or valves to duplicate the previously described exhaust gas treatment systems along more than one of the parallel exhaust conduits.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An emissions system for reducing nitrogen oxides in engine exhaust, the system comprising:
    an emissions catalyst having an inlet adapted to receive an exhaust from the engine;
    an injector operable to inject a liquid reductant into the exhaust upstream of the catalyst;
    a first liquid fuel;
    a fuel tank storing the first liquid fuel for combustion within the engine;
    a second liquid fuel;
    a supplemental reductant tank storing the second liquid fuel for injection into the exhaust; and
    a valve being supplied the first liquid fuel from the fuel tank as a first reductant, the valve also being in receipt of the second liquid fuel as a second reductant from the supplemental reductant tank, wherein the valve is in receipt of both the first and second liquid reductants such that one or both of the first and second liquid fuels is suppliable to the injector to reduce nitrogen oxides within the exhaust.

2. The emissions system of claim 1 wherein the first liquid fuel includes one of gasoline, E85 and E95.

3. The emissions system of claim 1 wherein the first liquid fuel includes one of diesel fuel, biofuel B5, biofuel B10 and biofuel B20.

4. The emissions system of claim 1 wherein the second reductant includes one of E85, E95, B5, B10 and B20.

5. The emissions system of claim 1 further including an electronic control unit including program logic which when executed signals the injector to selectively inject reductant into the exhaust.

6. The emissions system of claim 5 wherein the electronic control unit controls the valve based on input from vehicle sensors.

7. An emissions system for reducing nitrogen oxides in engine exhaust, the system comprising:
    an emissions catalyst having an inlet adapted to receive an exhaust from the engine;
    a liquid fuel;
    a fuel tank storing the fuel and being adapted to provide the fuel for combustion within the engine;
    a first injector operable to inject fuel into the exhaust upstream of the catalyst;
    a liquid supplemental reductant;
    a supplemental reductant tank storing the supplemental reductant;
    a second injector operable to inject supplemental reductant into the exhaust upstream of the catalyst; and
    an electronic control unit including program logic which when executed determines a carbon to nitrogen ratio of the fuel and the supplemental reductant, the electronic control unit being operable to actuate the first and second injectors and vary the supply of fuel and supplemental reductant into the exhaust to reduce nitrogen oxides within the exhaust based on the carbon to nitrogen ratios.

8. The emissions system of claim 7 wherein the electronic control unit determines a target ratio of fuel to supplemental reductant to be injected into the exhaust based on an engine operating condition.

9. The emissions system of claim 7 wherein the fuel includes one of gasoline, E85, E95, diesel fuel, biofuel B5, biofuel B10 and biofuel B20.

10. The emissions system of claim 7 wherein the supplemental reductant includes one of E85, E95, B5, B10 and B20.

11. The emissions system of claim 7 further including a burner in receipt of the exhaust and positioned upstream from the first and second injectors.

12. The emissions system of claim 11 further including a diesel particulate filter positioned downstream of the burner and upstream of the first and second injectors.

13. The emissions system of claim 7 wherein the first and second injectors simultaneously inject the fuel and the supplemental reductant into the exhaust.

14. An emissions system for reducing nitrogen oxides in engine exhaust, the system comprising:
    an emissions catalyst having an inlet adapted to receive an exhaust from the engine;
    a liquid fuel;
    a fuel tank storing the liquid fuel and being adapted to provide the fuel for combustion within the engine;
    a first injector operable to inject the liquid fuel into the exhaust upstream of the catalyst;
    a liquid supplemental reductant;
    a supplemental reductant tank storing the liquid supplemental reductant;
    a second injector operable to inject the liquid supplemental reductant into the exhaust upstream of the catalyst;
    a burner in receipt of the exhaust and positioned upstream from the first and second injectors;

a diesel particulate filter positioned downstream of the burner and upstream of the first and second injectors; and an electronic control unit including program logic which when executed activates the burner as well as the first and second injectors to vary the supply of fuel and supplemental reductant into the exhaust to reduce nitrogen oxides within the exhaust.

15. The emissions system of claim 14 wherein the fuel includes one of gasoline, E85 and E95.

16. The emissions system of claim 14 wherein the supplemental reductant includes one of E85, E95, B5, B10 and B20.

17. An emissions system for reducing nitrogen oxides in engine exhaust, the system comprising:
- a first emissions catalyst having an inlet adapted to receive an exhaust from the engine;
- a second emissions catalyst having an inlet adapted to receive an exhaust from the first emissions catalyst;
- a liquid fuel;
- a fuel tank storing the liquid fuel and being adapted to provide the fuel for combustion within the engine;
- a first injector operable to inject the liquid fuel into the exhaust upstream of the first catalyst;
- a liquid supplemental reductant;
- a supplemental reductant tank storing the liquid supplemental reductant; and
- a second injector operable to inject liquid supplemental reductant into the exhaust upstream of the second catalyst and downstream of the first catalyst.

18. The emissions system of claim 17 further including a burner and an electronic control unit including program logic which when executed actuates the burner as well as the first and second injectors to vary the supply of fuel and supplemental reductant into the exhaust to reduce nitrogen oxides within the exhaust.

19. The emissions system of claim 18 further including a valve operable to switch the reductant supply and provide the liquid fuel to the second injector and the liquid supplemental reductant to the first injector.

20. The emissions system of claim 8, wherein the engine operating condition includes a throttle position.

* * * * *